April 25, 1961 R. W. WHEELER 2,981,841
LIQUID LEVEL MONITOR SYSTEM
Filed Aug. 12, 1957 2 Sheets-Sheet 1

INVENTOR
ROSS W. WHEELER
BY
ATTORNEY

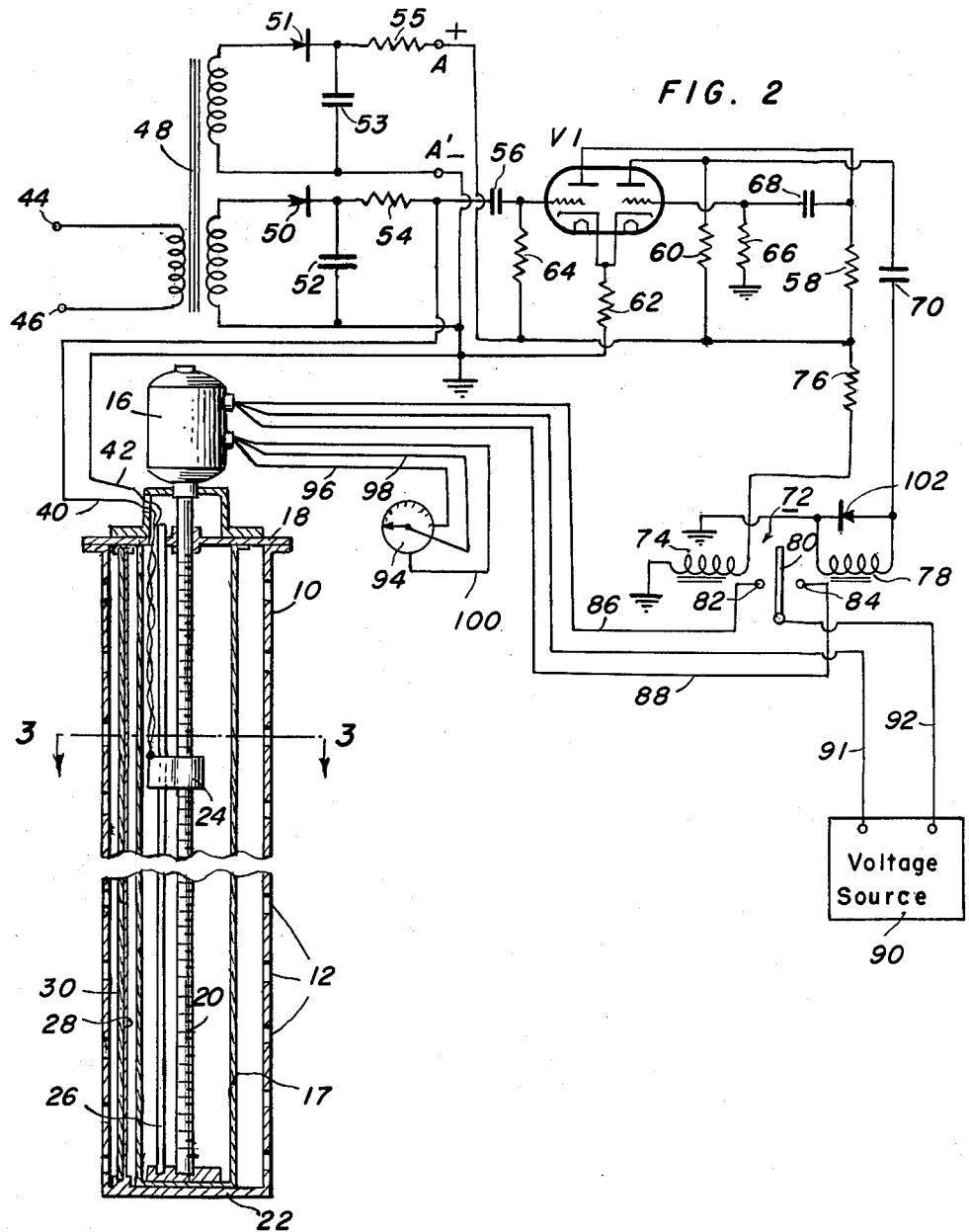
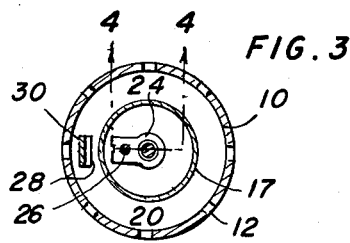

United States Patent Office 2,981,841
Patented Apr. 25, 1961

2,981,841

LIQUID LEVEL MONITOR SYSTEM

Ross W. Wheeler, Santa Ana, Calif., assignor to Robertshaw-Fulton Controls Company, Richmond, Va., a corporation of Delaware Filed Aug. 12, 1957, Ser. No. 677,705

4 Claims. (Cl. 250—43.5)

This invention relates to liquid level detectors, and more particularly to a combination of circuitry and components for use in conjunction with a liquid level monitor system using a radiosensitive detector.

A primary object of this invention is to visually indicate at a remote location the liquid level within a container.

Another object of this invention is to automatically sense spatial deviations in the location of a liquid surface and continuously reposition a radiation-sensing assembly in accordance therewith.

A further object of this invention is to detect variations in the quantity of fluid or pulverulent material contained within a housing and provide a visual indication thereof.

A still further object of this invention is to automatically control the level of a body of liquid confined within a container.

Other objects and advantages of the present invention will become apparent from the following description taken in connection with the accompanying drawings wherein:

Fig. 2 is a longitudinal sectional view of the various structural components located within the outer housing in combination with an illustration in schematic form of the structure and components of the measuring circuitry used in conjunction therewith;

Fig. 3 is a sectional view taken along the lines 3—3 of Fig. 2; and

Figure 1:
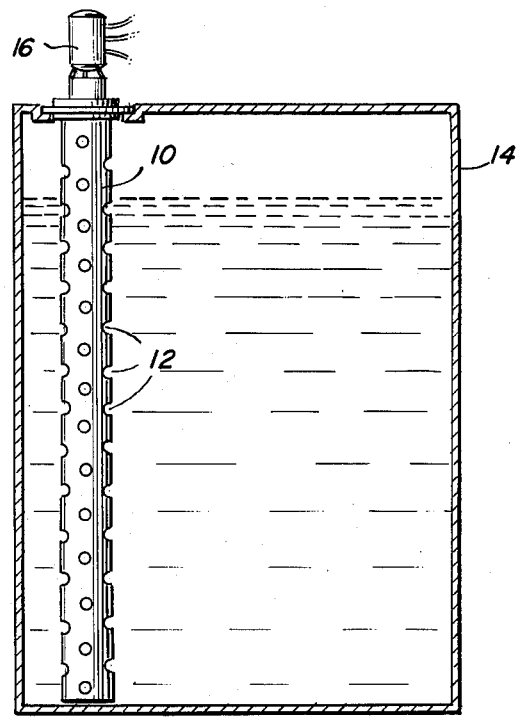
Fig. 1 is a schematic view of a typical installation and illustrates a method of mounting a perforated outer housing and reversible motor in order to provide a visual indication of the fluid level within a container.

Referring more particularly to Fig. 1, the outer housing 10 of the submersible detector assembly is provided with a plurality of spaced holes or perforations 12 which permit fluid or flowable materials contained within tank 14 to enter the interior of the housing. On the upper portion of the tank 14 there is provided a reversible electric motor 16 which imparts vertical rectilinear motion to certain of the parts contained within the housing 10 in a manner which will be appreciated more fully as the detailed description of the invention proceeds.

The provision for the spaced holes or perforations 12 in the outer housing is clearly illustrated in the sectional view of the invention provided in Fig. 2, which also shows an elongated cylindrical inner housing 17 which is mounted concentrically with respect to the outer housing 10 in order to define an annular fluid volume therebetween. The closed lower end of the inner housing 17 is secured to the lowermost surface of the outer housing 10, and the circular rim of the upper end of the inner housing 17 is secured to the under side of a closure plate 18 which seals the upper end of the housing 10. This method of securing the opposite ends of the inner housing 17 provides a hermetically sealed volume for the various components contained therewithin.

A threaded rod 20 is journaled for rotation at its lower end in a bearing plate 22. The rod 20 at its opposite end extends exteriorly through the closure plate 18 and is connected to receive driving torque from the reversible motor 16. Within the inner housing 17, there is also provided a radiation-sensing assembly 24 which is mounted to threadedly engage the rod 20 and move vertically in response to the rotation thereof. In order to regulate the displacement of the assembly 24 along the rod 20, a guide rod 26 is rigidly affixed in spaced relationship with respect thereto. The lower end of the rod 26 is secured within the bearing plate 22, and the upper end engages the closure plate 18. The radiation-sensing assembly 24 is apertured for the reception of the rod 26 which extends therethrough.

On one side of the sensing assembly 24, there is provided an elongated radiation source 28. The source 28 takes the form of a vertically extending rod or bar provided with a radiation-emissive coating 30 on the portion which parallels the vertical surface of the radiation-sensing assembly. A coating of material such as Strontium 90 which emits copious quantities of beta rays has been found to yield satisfactory results in practicing the invention. The source 28 is mounted in radially spaced relationship with respect to the detector assembly 24, which causes it to be submerged in the annular fluid volume between the outer and inner housings 10 and 17, respectively.

In general, this radial spacing is important and is a function of the radiation absorptivity of the particular material contained within the tank 14. The specific radial distance between the source 28 and the assembly 24 must be such that the volume of material therebetween is capable of shielding the assembly from radiant energy emitted by the source. This means that the mass of the material must be capable of absorbing all such radiation when the entire sensing assembly 24 is below the surface of the fluid. Or, when the lower half of the assembly is submerged, the detector must receive radiation from only that portion of the radiation source 28 which extends above the surface of the liquid.

As seen most clearly in Fig. 3, the source 28 may comprise a bar having a square of oblong cross-sectional area. However, it will be appreciated that an elongated radiation source with a different cross-sectional area could be substituted.

In order to conclude the portion of the detailed description which refers to the structural components of the invention, reference will now be made to Fig. 4. In this figure, the numeral 24 is again used to designate generally the radiation sensing assembly 24. In the upper and lower surfaces of the asesmbly there is provided a pair of internally threaded bushings 32 and 34, respectively. The bushings 32 and 34 engage the threaded rod 20 as shown.

The guide rod 26 extends through the respective upper and lower surfaces of the assembly, and maintains the spatial orientation of the assembly with respect to the elongated radiation source 28 shown in Fig. 1. At the left-hand compartment of the radiation-sensing assembly 24, as viewed in Fig. 4, there is provided a radiation detector 36. The detector 36 may comprise a conventional Geiger-Mueller detector of the type characterized by the ability to generate a series of individual voltage pulses as a result of bombardment by a corresponding number of penetrating particles, such as beta rays or gamma rays. If desired, the detector 36 may take the form of a scintillation crystal which is used in conjunction with a photomultiplier tube to produce a wavetrain of discrete electrical pulses having magnitudes proportional to the energy of the bombarding particles. Although the system is described as employing a Geiger counter, it will be nevertheless appreciated that the invention is not limited to the use of any specific type of detector.

Figure 4:
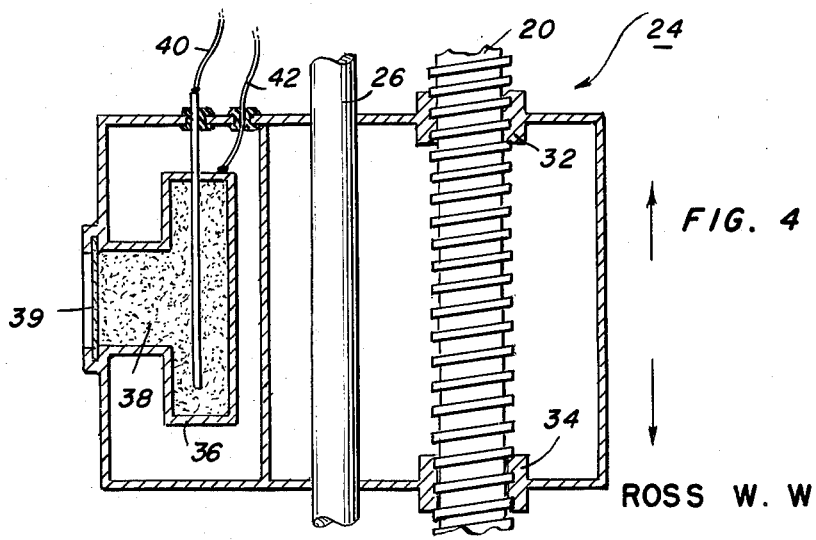
Fig. 4 is a sectional view taken along the lines 4—4 of Fig. 3.

The detector 36 shown in Fig. 4 is provided with a window portion 38 through which the penetrating radiations from the source 28 are permitted to enter and act upon the gas confined within the detector. The window portion 38 is dimensioned and located to render the detector sensitive only to perpendicularly incident radiation from the source 28. As a result, other stray radiations, such as scattered secondaries and the like, are unable to excite the detector and cause erroneous indications of the level of the enclosed material. It will also be recalled in this connection that the assembly 24 is sensitive only to the radiations emitted by that portion of the source 28 which extends above the surface of the material.

The portion 38 within the detector is effectively sealed by means of the end plate 39. The plate 39 may be formed of stainless steel or other suitable material which permits the beta rays emitted by the source 28 to readily penetrate therethrough. The usual central electrode and the housing of the radiation detector 36 are connected to a pair of conductors 40 and 42, respectively, which penetrate suitable grommets provided in the upper surface of the assembly 24, and extend upwardly therefrom. The manner in which the conductors 40 and 42 extend upwardly and emerge from the closure plate 18 is illustrated most clearly in Fig. 4.

The circuitry and components employed in practicing the invention are also clearly illustrated in Fig. 2. In the upper left-hand portion of Fig. 2, the terminals 44 and 46 are shown as connected to receive conventional 115 volt 60 cycle alternating voltage. The potential thus impressed upon the terminals 44 and 46 is applied across the primary winding of a transformer 48. The opposite ends of one secondary winding of the transformer 48 are connected in series through a rectifier 50 and a capacitor 52. The common junction between the rectifier 50 and capacitor 52 is coupled to the control grid electrode of a dual triode V1 through the resistor 54 and coupling capacitor 56 connected in series.

The operating potential for the dual triode V1 is provided by a D.C. voltage supply illustrated to the upper left of the circuit. This voltage supply utilizes one of the secondary windings provided upon the transformer 48, and receives alternating voltage therefrom. The opposite ends of this particular winding are interconnected through a rectifier 51 and a capacitor 53. The common junction between the rectifier 51 and capacitor 53 is coupled to the positive terminal A through resistor 55. The negative terminal A' is connected to one plate of the capacitor 53 and is also grounded. The unidirectional voltage developed across the terminals A and A' provides plate potential for the circuitry shown in Fig. 2. More particularly, this plate potential is applied to the anodes of the left and right side triode sections of V1 via plate load resistors 58 and 60, respectively. A cathode resistor 62 is interconnected between the grounded negative terminal of the D.C. voltage supply and the commonly connected cathodes of the triode sections within tube V1. The control grid electrode of the left-hand triode is connected to the positive terminal of the voltage supply through a resistor 64; the control grid electrode of the right-hand triode is connected to ground through a resistor 66. The output signal developed at the anode of the left-hand triode is applied to the right-hand control grid via coupling capacitor 68. The ultimate output signal of both triode sections, as developed at the right-hand anode, is tapped off via coupling condenser 70.

To the lower right of Fig. 2, there is shown a polarized relay which is indicated generally by the reference numeral 72. The relay 72 includes a first operating coil 74 which receives excitation current directly from the D.C. voltage supply through a dropping resistor 76. The relay also includes a second operating coil 78 which is positioned adjacent to the first operating coil.

A pivoted flux-sensitive armature 80 is provided between the innermost ends of the first and second operating coils and is normally biased by the magnetic attraction of the coils to a symmetrically balanced position therebetween. Under normal conditions, the electromagnetic flux produced by both operating coils is identically equal, and the armature 80 is forced to remain in a neutral position intermediate the opposite ends of the coils. The manner by which an increase or decrease in the fluid level is used to unbalance the relay 72 in order to actuate the reversible motor 16 will be appreciated more fully as the detailed description progresses.

A pair of conductive metallic contacts 82 and 84 are provided on opposite sides of the armature 80. The left side contact 82 is interconnected to a first field winding within the stator of motor 16 by means of conductor 86. Conversely, the right side contact 84 is interconnected to a second field winding within the stator of motor 16 by means of conductor 88. The pivoted armature 80 is itself connected through conductor 92 to one of the output terminals of a voltage source 90 which may provide either alternating or unidirectional voltage. The opposite terminal 91 of the source 90 is connected in known fashion to a point on the earlier mentioned stator windings within the motor 16. Since the method of reversing the direction of the output torque supplied by motor 16 in accordance with the selective actuation of the several field windings is known to those skilled in the art, exhaustive explanation thereof is deemed unnecessary.

In order to provide a visual indication of the level of the material within the tank 14, a dial indicator 94 is connected to sense the rotation of the motor 16. The indicator 94 may include a rotatable pointer which is operated as a selsyn, in response to electrical signals conveyed over conductors 96, 98, and 100. Or, alternatively, the dial indicator may be connected to respond to the movement of motor 16 by means of a suitable gear train and associated linkage. Thus, it will be appreciated that the invention is not limited to any specific form of rotation-responsive device for providing a visual indication of the depth of the material, and that the indicator 94 may be located remotely from the tank 14 and associated installation.

Turning now to the theory of operation of the invention, it should first be appreciated that the operating potentials and parameters of the measuring circuitry are proportioned in such a manner that the armature 80 in relay 72 is maintained in a neutral position only when the assembly 24 is one-half submerged and the liquid level coincides with the midpoint of the window portion 38 within radiation detector 36. Under these circumstances, the detector 36 receives ionizing radiations only from the portion of the elongated radiation source 28 which extends above the level of the liquid. These radiations, which may take the form of beta rays, penetrate the end plate 39 in the radiation assembly and enter the window portion 38. As a result, the gas within the detector is periodically ionized, and a wavetrain of discrete voltage pulses is transmitted over conductors 40 and 42 to the input of the electronic measuring circuitry.

The conductors 40 and 42 are connected between the coupling capacitor 56 and ground, in order to couple the output of the radiation detector into the left-hand triode section of the tube V1. The amplified voltage pulses developed at the anode of the left-hand triode are connected to the control grid of the right-hand triode section of tube V1 and cause a regenerative action therein. This is because each of the amplified output pulses available at the left-hand anode charges the coupling capacitor 68 which is connected to the right-hand control grid. As a result, an output voltage pulse having an appreciably longer duration is produced at the right-hand anode of the tube V1. The duration of these output pulses is controlled by the relative values of the coupling capacitor 68 and the resistors 58 and 66.

The output pulses thus generated are applied to the operating coil 78, via coupling condenser 70. A unidirectional energizing current is developed for the operating coil by the combined action of condenser 70, the inductance of the coil 78, and the diode 102 connected in shunt across the coil. As earlier stated, the magnitude of the current thus developed is sufficient to bias the pivoted armature 80 to neutral position when the fluid level substantially coincides with the horizontal centerline of the radiation detector 36.

When the level of the fluid within the tank 14 falls below this point, the detector 36 receives a greater amount of radiation from the radiation-emissive coating 30 provided upon elongated source 28. This radiation penetrates the detector 36 and ionizes the gas therein to provide an increased number of discrete negative voltage pulses. These pulses are transmitted over the conductors 40 and 42 to the measuring circuitry, where they are applied between the coupling capacitor 56 and ground. The pulses from the left side anode of the tube V1 are used to excite the control grid circuit of the right side triode section, and appear in amplified form at the anode thereof in the shape of voltage pulses having a predetermined duration. This, of course, is effected by the regenerative action earlier referred to in this specification. The amplified output pulses thus developed are applied to the parallel connected coil 78 and diode 102, via capacitor 70. The average rectified current thus produced in the operating coil 78 produces a value of magnetic flux which exceeds that produced by the coil 74, and the pivoted armature 80 is deflected clockwise into engagement with the right side contact 84. As a result, current from the voltage source 90 is applied through armature 80, contact 84, and conductor 88 to the field winding of the reversible motor 16. The motor 16 then rotates the threaded rod 20, and displaces the radiation-sensing assembly 24 vertically downward. As the assembly 24 is immersed more deeply in the liquid, the number of voltage pulses supplied to the measuring circuit is sharply reduced, and the magnitude of the unidirectional current through the operating coil 78 decreases. When the fluid level substantially coincides with the horizontal centerline of the radiation detector 36, as indicated by the predetermined diminution in the magnetic flux generated by the operating coil 78, the pivoted armature 80 returns to its geometrically neutral position between the contacts 82 and 84, and the rotation of the reversible motor 16 terminates.

When the volume of fluid within tank 14 increases and the liquid level exceeds the horizontal centerline of the detector 36, the number of pulses produced by the detector diminishes. The resulting decrease in the magnitude of the exciting current which flows through coil 78 causes the magnetic attraction of the coil 74 to predominate. This causes the armature 80 to deflect into engagement with the left side contact 82. The resulting current from the source 90 flows through the armature 80, the contact 82, and conductor 86 and causes the motor 16 to rotate in a direction which moves the detector upward. The direction of rotation of the motor 16 for this sequence of events is, of course, reversed with respect to the earlier discussed sequence which accompanies diminutions in the liquid level.

When the upward movement of the detector brings its horizontal centerline into coincidence with the surface of the material within the tank 14, the increased quantity of radiation detected from the radiation emitting coating 30 produces a wavetrain of discrete voltage pulses for amplification within the dual triode V1. The rectified component of these amplified pulses is applied to the operating coil 78 to provide sufficient magnetic attraction to restore the armature 80 to neutral position between the contacts 82 and 84 and the movement of the motor is terminated. It will now be appreciated that the scheme of electronic circuitry and components provided by the present invention tends to sustain the center of the radiation detector assembly at the level of the liquid at all times.

Since the invention embodies a closed loop type feedback control system, the accuracy of the indication is completely independent of either the gain of the amplifier or the regulation of the various voltage sources used to energize the circuit. Another highly advantageous feature of the invention is attributable to the fact that the degree of accuracy is independent of the absolute value of the liquid level, and remains the same for both a maximum and a minimum value of material within the tank 14.

It should be appreciated that the use of a first radiation-sensing element above the level of the confined material, with a second radiation-sensing element therebeneath would be deemed to fall within the purview of the invention disclosed and claimed herein. Under these circumstances, the balance point for the movable armature 80 is fixed at the level where the upper element samples the radiation emitted by source 28, and the lower element is completely shielded therefrom.

Although the invention has been described in connection with a fluid-measuring system, it should be appreciated that it is by no means limited to use in metering liquids, and could be employed in metering the level of grain, flour, or other pulverulent material. These and other variations and arrangements could be made within the scope of the appended claims.

I claim:

1. In a system for controlling and visually indicating the level of a volume of confined material, the combination comprising: a detector assembly adapted to be partially submerged in the confined material and including an outer perforated tubular housing, an inner imperforate tubular housing disposed concentric with said outer housing and being sealed to prevent the material from entering the interior of said inner housing, a stationary elongated emitter disposed between said inner and outer housings and extending substantially throughout the length thereof having portions adapted to extend above and below the surface of the confined material, a radiation detector disposed within said inner housing and being movable along a path parallel to said emitter, said detector being constructed to absorb only radiation impinging thereon in a direction perpendicular thereto and produce electrical pulses in response thereto, said emitter and detector being spaced to prevent radiation from the portion of said emitter below the surface of the material from reaching said detector, means including an amplifier circuit connected to receive and amplify said pulses, switching means connected to occupy either of two positions in accordance with the relative magnitude of a unidirectional component of said pulses, and motor means connected to receive power through said switching means and displace said detector.

2. In a system for controlling and visually indicating the level of a volume of confined material, the combination comprising: a detector assembly adapted to be partially submerged in the confined material and including an imperforate tubular housing, a rotatable threaded shaft disposed within said housing, a guide rod disposed in said housing parallel to said shaft, a stationary elongated emitter disposed adjacent to said housing and extending substantially throughout the length thereof having portions adapted to extend above and below the surface of the confined material, a second housing operatively connected to said shaft and said rod and being movable in response to rotation of said shaft, a radiation detector disposed within said second housing and being movable therewith along a path parallel to said emitter, said detector being constructed to absorb only radiation impinging thereon in a direction perpendicular thereto, said emitter and detector being spaced to prevent radiation from the portion of said emitter below the surface of the material from reaching said detector, and means interconnecting said emitter and said detector to rotate said shaft and move said detector in accordance with radiation received from the portion of the emitter immediately above the surface of the material in response to changes in the level of the surface.

3. In a system for controlling and visually indicating the level of a volume of confined material, the combination comprising, a detector assembly adapted to be partially submerged in the confined material and including an outer perforated tubular housing, an inner imperforate tubular housing disposed concentric with said outer housing, a stationary elongated emitter disposed between said inner and outer housings and extending substantially throughout the length thereof having portions adapted to extend above and below the surface of the confined material, a radiation detector including an ionizing chamber and window means disposed within said inner housing and being movable along a path parallel to said emitter, said window means being constructed to admit into said ionizing chamber only radiation perpendicular thereto, said emitter and detector being spaced to prevent radiation from the portion of said emitter below the surface of the material from reaching said detector, and means interconnecting said emitter and said detector to move said detector in accordance with radiation received from the portion of the emitter immediately above the surface of the material in response to changes in the level of the surface.

4. In a system for controlling and visually indicating the level of a volume of confined material, the combination comprising, a detector assembly adapted to be partially submerged in the confined material and including an outer perforated tubular housing, an inner imperforate tubular housing disposed concentric with said outer housing, a stationary elongated emitter disposed between said inner and outer housings and extending substantially throughout the length thereof having portions adapted to extend above and below the surface of the confined material, a radiation detector disposed within said inner housing and being movable along a path parallel to said emitter, said detector being constructed to absorb only radiation impinging thereon in a direction perpendicular thereto, said emitter and detector being spaced to prevent radiation from the portion of said emitter below the surface of the material from reaching said detector, and means interconnecting said emitter and said detector to move said detector in accordance with radiation received from the portion of the emitter immediately above the surface of the material in response to changes in the level of the surface.

References Cited in the file of this patent

UNITED STATES PATENTS

| | | |
|---|---|---|
| 2,433,718 | Teplitz | Dec. 30, 1947 |
| 2,641,034 | Harter | June 9, 1953 |
| 2,714,167 | Herzog | July 26, 1955 |
| 2,722,609 | Morgan, et al. | Nov. 1, 1955 |
| 2,734,136 | Atchison | Feb. 7, 1956 |
| 2,737,592 | Ohmart | Mar. 6, 1956 |

FOREIGN PATENTS

| | | |
|---|---|---|
| 703,712 | Great Britain | Feb. 4, 1954 |
| 734,873 | Great Britain | Aug. 10, 1955 |

OTHER REFERENCES

Review of Scientific Instruments, November 1946, page 517.

Review of Scientific Instruments, April 1957, page 300.